(12) United States Patent
Asaumi (10) Patent No.: US 8,434,130 B2
(45) Date of Patent: Apr. 30, 2013

(54) AUTHENTICATION SYSTEM, SERVER APPARATUS AND AUTHENTICATION METHOD

(75) Inventor: Yoshiya Asaumi, Tokyo (JP)

(73) Assignee: Sony Corporation (JP)

( * ) Notice: Subject to any disclaimer, the term of this patent is extended or adjusted under 35 U.S.C. 154(b) by 564 days.

(21) Appl. No.: 12/321,824

(22) Filed: Jan. 26, 2009

(65) Prior Publication Data

US 2009/0193502 A1 Jul. 30, 2009

(30) Foreign Application Priority Data

Jan. 28, 2008 (JP) ................................ P2008-016521

(51) Int. Cl.
H04L 29/06 (2006.01)
(52) U.S. Cl.
USPC ...................... 726/3; 726/9; 726/27; 713/169
(58) Field of Classification Search .................. 726/9, 3, 726/27; 713/169; 380/255, 277; 709/228, 709/229
See application file for complete search history.

(56) References Cited

U.S. PATENT DOCUMENTS

| | | | | |
|---|---|---|---|---|
| 6,615,264 | B1 * | 9/2003 | Stoltz et al. | 709/227 |
| 7,266,695 | B2 * | 9/2007 | Nakayama | 713/172 |
| 7,565,536 | B2 * | 7/2009 | Vassilev et al. | 713/168 |
| 7,840,808 | B2 * | 11/2010 | Takamizawa et al. | 713/170 |
| 7,937,586 | B2 * | 5/2011 | Torre et al. | 713/168 |
| 2004/0250076 | A1 | 12/2004 | Kung | |
| 2004/0255166 | A1 * | 12/2004 | Shimizu | 713/201 |
| 2005/0021954 | A1 | 1/2005 | Kung | |
| 2005/0039010 | A1 * | 2/2005 | Grove | 713/170 |
| 2005/0246531 | A1 * | 11/2005 | Fabre | 713/168 |
| 2006/0168651 | A1 * | 7/2006 | Araki et al. | 726/6 |
| 2007/0234404 | A1 * | 10/2007 | Bogdanovic et al. | 726/3 |
| 2007/0300306 | A1 * | 12/2007 | Hussain | 726/27 |
| 2008/0263652 | A1 * | 10/2008 | McMurtry et al. | 726/9 |

FOREIGN PATENT DOCUMENTS

| | | |
|---|---|---|
| JP | 10154131 A | 6/1998 |
| JP | 2001318896 A | 11/2001 |
| JP | 2003150553 A | 5/2003 |
| JP | 2004151863 A | 5/2004 |
| JP | 2005-050308 A | 2/2005 |

OTHER PUBLICATIONS

Office Action from Japanese Application No. 2008-016521, dated Oct. 9, 2012.

Peter Wayner, Technology of Digital Signature which Improves Safety of Internet, Nikkei Byte, Japan, Nikkei Business Publications, Jul. 22, 1997, No. 167, pp. 333-343. (English translation of description from Office Action).

* cited by examiner

Primary Examiner — Ali Abyaneh
(74) Attorney, Agent, or Firm — Lerner, David, Littenberg, Krumholz & Mentlik, LLP (57) ABSTRACT

An authentication system includes: a server apparatus; a terminal device; and an authentication device connected to the terminal device and used for authentication when establishing a session between the terminal device and the server apparatus. The server apparatus has an authentication request data creating unit configured to create authentication request data to authenticate the terminal device, and a sending unit configured to send authentication request data. The terminal device has a receiving unit configured to receive authentication request data, an authentication reply data creation requesting unit configured to request the authentication device to create authentication reply data, and a sending unit configured to send the authentication reply data. The server apparatus further has: an authentication processing unit configured to authenticate the terminal device based on the authentication reply data, and as a result of authentication, data is sent to the terminal device when the terminal device is authenticated.

10 Claims, 8 Drawing Sheets

AUTHENTICATION SYSTEM, SERVER APPARATUS AND AUTHENTICATION METHOD

CROSS REFERENCES TO RELATED APPLICATIONS

The present application claims priority from Japanese Patent Application No. JP 2008-016521, filed in the Japanese Patent Office on Jan. 28, 2008, the entire content of which is incorporated herein by reference.

BACKGROUND OF THE INVENTION

1. Field of the Invention

The present invention relates to an authentication system, a server apparatus, and an authentication method, particularly to an authentication system, a server apparatus, and an authentication method, in which an authentication device is used to authenticate a terminal device.

2. Description of the Related Art

Heretofore, in a computer system provided over networks, various methods are designed to securely and reliably conduct user authentication. As one of such authentication methods, there is a method in which a device called a personal identification device such as a USB token or an IC card is used for authentication. In this method, a personal identification device on which authentication information is recorded is attached to a user terminal device for authentication between the terminal device and a server with the authentication information stored in the personal identification device.

For example, in Patent Reference 1 (JP-A-2005-50308), such an authentication device is disclosed that in conducting authentication according to a digital certificate, the authentication device can conduct authentication without making a request to an authentication server and the like for network connection. The authentication device stores therein a public key associated with a certificate authority to authenticate a digital certificate, and uses a secret key to create and output a service key matched with an application. As described above, the personal identification device is used for authentication, whereby security level can be improved more than that of authentication according to user entries such as a user ID and a password.

SUMMARY OF THE INVENTION

However, even after authentication is established between a server apparatus and a terminal device by a personal identification device, the personal identification device can be removed from the terminal device. In this case, because a communication channel is established by authentication using the personal identification device previously used, data is sometimes sent even though the personal identification device is removed, which causes a problem that information is leaked to a third party other than a user who owns the personal identification device.

Thus, it is desirable to provide a novel, improved authentication system, server apparatus, and authentication method, in which a server apparatus can confirm connection to an authentication device that is connected to a terminal device after a communication channel is established between the server apparatus and the terminal device with the authentication device.

According to an embodiment of the invention, there is provided an authentication system including: a server apparatus, a terminal device connected to the server apparatus over a network, and an authentication device connected to the terminal device and used for authentication at the time of establishing a session between the terminal device and the server apparatus.

The server apparatus has: an authentication request data creating unit configured to create authentication request data to authenticate the terminal device; and a sending unit configured to send authentication request data created by the authentication request data creating unit. The terminal device has: a receiving unit configured to receive authentication request data sent from the server apparatus; an authentication reply data creation requesting unit configured to request the authentication device to create authentication reply data corresponding to the authentication request data received by the receiving unit; and a sending unit configured to send the authentication reply data created by the authentication device to the server apparatus. Then, the server apparatus further has: an authentication processing unit configured to authenticate the terminal device based on the authentication reply data sent from the terminal device, wherein as a result of authentication conducted by the authentication processing unit, data is sent to the terminal device when the terminal device is authenticated.

According to this configuration, after the personal identification device connected to the terminal device is used for mutual authentication between the server apparatus and the terminal device and a secure communication channel is reserved, authentication request data is created to authenticate the terminal device, and sent to the terminal device before the server apparatus sends data to the terminal device. The terminal device receives the authentication request data sent from the server apparatus, uses the personal identification device to create authentication reply data corresponding to the authentication request data, and sends back the authentication reply data to the server apparatus. The server apparatus authenticates the terminal device based on the authentication reply data sent from the terminal device.

The server apparatus can send data only when the server apparatus is able to authenticate the terminal device before sending data after the session is established to the terminal device. In other words, the server apparatus can check whether the personal identification device is removed from the terminal device before the server apparatus sends data. Therefore, data is sent only when it is determined that the terminal device can reliably use the personal identification device.

Generally, even though the personal identification device is removed after mutual authentication is conducted between the server apparatus and the terminal device and a communication channel is established, encrypted communications are continued unless the terminal device disconnects the communication channel. In this case, suppose software is authorized software, the communication channel is generally disconnected at the same time when the personal identification device is removed. However, for example, in the case in which malicious software such as virus software exists, it is likely that the connection is maintained as though communications are continuing.

In this system, as described above, the server apparatus checks whether the personal identification device is removed from the terminal device before sending data, that is, the terminal device can reliably use the personal identification device. Accordingly, such an event can be prevented that data is sent to the terminal device from which the personal identification device is removed and information is leaked to a third party.

In order to solve the problem, according to another embodiment of the invention, there is provided a server apparatus, wherein an authentication device connected to a terminal device is used for authentication at the time of establishing a session to the terminal device connected over a network.

The server apparatus includes: an authentication request data creating unit configured to create authentication request data to authenticate the terminal device; a sending unit configured to send authentication request data created by the authentication request data creating unit; a receiving unit configured to receive authentication reply data created by the authentication device connected to the terminal device and corresponding to the authentication request data; and an authentication processing unit configured to authenticate the terminal device based on the authentication reply data received by the receiving unit, wherein as a result of authentication conducted by the authentication processing unit, data is sent to the terminal device when the terminal device is authenticated.

According to this configuration, after the personal identification device connected to the terminal device is used for mutual authentication between the server apparatus and the terminal device and a secure communication channel is reserved, authentication request data to authenticate the terminal device is created and sent to the terminal device before the server apparatus sends data to the terminal device. The terminal device receives the authentication request data sent from the server apparatus, uses the personal identification device to create authentication reply data corresponding to the authentication request data, and sends back the authentication reply data to the server apparatus. The server apparatus authenticates the terminal device based on the authentication reply data sent from the terminal device.

The server apparatus can send data only when the server apparatus is able to authenticate the terminal device before sending data after the session is established to the terminal device. In other words, the server apparatus can check whether the personal identification device is removed from the terminal device before the server apparatus sends data. Therefore, data is sent only when it is determined that the terminal device can reliably use the personal identification device. Accordingly, such an event can be prevented that data is sent to the terminal device from which the personal identification device is removed and information is leaked to a third party.

In addition, the authentication request data creating unit may create authentication request data just before the data is sent in response to a data sending request from the terminal device. According to this configuration, the terminal device can be authenticated, which makes a request to send data. The authentication request data creating unit may create authentication request data every time when the terminal device is authenticated. The authentication request data is information that can be created only when the terminal device is authenticated. Therefore, the authentication request data is created every time when the terminal device is authenticated, and it can be confirmed that the authentication device is reliably connected to the terminal device.

As a result of authentication conducted by the authentication processing unit, connection to the terminal device may be disconnected when it is unable to authenticate the terminal device. In addition, as a result of authentication conducted by the authentication processing unit, authentication error may be sent to the terminal device when it is unable to authenticate the terminal device. When it is unable to authenticate the terminal device, the status of the personal identification device is as follows: the personal identification device is removed which has been connected to the terminal device at the time of establishing the session, or it is difficult to correctly read user information out of the personal identification device. Therefore, because it is difficult to reserve a secure communication channel when it is unable to confirm the connection to the personal identification device, the server apparatus disconnects the connection to the terminal device, whereby such an event can be prevented that the server apparatus sends data to leak information to a third party.

The server apparatus may include: an authentication determining unit configured to determine whether it is necessary to authenticate the terminal device depending on contents of data sent to the terminal device, wherein the authentication request data creating unit creates the authentication request data when the authentication determining unit determines that it is necessary to authenticate the terminal device. For example, it may be determined that it is necessary to authenticate the terminal device for data such as user's personal information that is necessary to prevent leakage to a third party, whereas it may be determined that it is unnecessary to authenticate the terminal device for data such as advertisements that are unnecessary to prevent leakage to a third party. Accordingly, unnecessary communications can be omitted while security is maintained.

The authentication request data may include time information at the time of sending data and hashes of transmission data, and may be created every time when data is sent. The authentication request data includes information such as time information at the time of sending data, hashes of transmission data, or temporarily random values that can be created only when data is sent to the terminal device. The authentication request data is created every time when data is sent, whereby it can be confirmed that the personal identification device is reliably connected to the terminal device at the time of sending data.

In order to solve the problem, according to still another embodiment of the invention, there is provided a terminal device which is connected to a server apparatus over a network, wherein an authentication device is used for authentication at the time of establishing a session to the server apparatus. The terminal device includes: a receiving unit configured to receive authentication request data created by the server apparatus to authenticate the terminal device; an authentication reply data creation requesting unit configured to request the authentication device to create authentication reply data corresponding to the authentication request data received by the receiving unit; and a sending unit configured to send the authentication reply data created by the authentication device to the server apparatus, wherein data is sent from the server apparatus when the server apparatus authenticates the terminal device based on the authentication reply data.

In order to solve the problem, according to yet another embodiment of the invention, there is provided an authentication method which is implemented with a server apparatus that uses an authentication device connected to a terminal device for authentication at the time of establishing a session to the terminal device connected over a network, and includes the steps of: creating authentication request data to authenticate the terminal device; sending the created authentication request data; receiving authentication reply data created by the authentication device connected to the terminal device and corresponding to the authentication request data; authenticating the terminal device based on the received authentication reply data; and as a result of authentication of the terminal device, sending data to the terminal device when the terminal device can be authenticated.

As described above, according to the embodiments of the invention, the server apparatus can confirm the connection to the authentication device that is connected to the terminal device after a communication channel is established between the server apparatus and the terminal device with the authentication device, and then information leakage can be prevented.

DESCRIPTION OF THE PREFERRED EMBODIMENTS

Hereinafter, preferred embodiments of the invention will be described in detail with reference to the accompanying drawings. In addition, in the specification and the drawings, overlapping descriptions are omitted for the components having basically the same functional configuration, by assigning the same numerals and signs.

Figure 1:
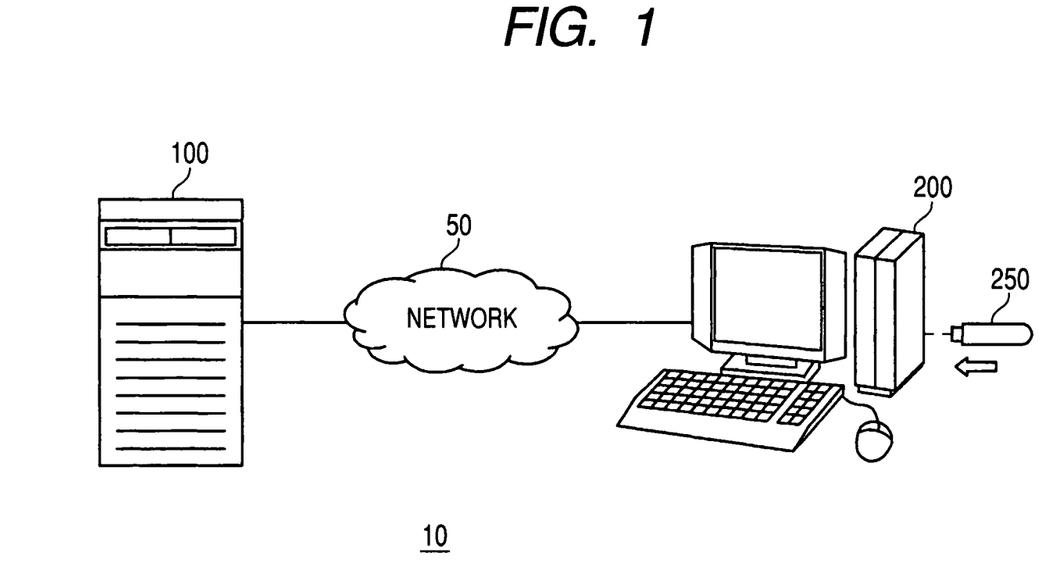
FIG. 1 shows an illustration depicting an exemplary configuration of an authentication system according to an embodiment of the invention.

First, the outline of an authentication system according to an embodiment of the invention will be described with reference to FIG. 1. FIG. 1 shows an illustration depicting an exemplary configuration of an authentication system 10 according to the embodiment. As shown in FIG. 1, the authentication system 10 is configured to include a server apparatus 100, a terminal device 200, and a network 50.

The network 50 may include a cable such as a copper wire or an optical fiber, a data transmission line for radio waves and the like, or a data relay such as a base station that controls rooters and conducts communications. The server apparatus 100 and the terminal device 200 can be connected to each other over the network 50. In addition, to the terminal device 200, a personal identification device 250 is connected, which records thereon authentication information corresponding to a user who operates the terminal device 200.

When a user operates the terminal device 200 to connect to the server apparatus 100, the authentication system 10 according to the embodiment uses the personal identification device 250 connected to the terminal device 200 for user authentication, and establishes secure communications between the server apparatus 100 and the terminal device 200.

Moreover, the authentication system 10 is a system that can confirm connection to the authentication device 250 connected to the terminal device 200 from the server apparatus 100 even after the personal identification device 250 is used to establish secure communications.

The terminal device 200 uses authentication information stored in the personal identification device 250 to conduct an authentication process with the server apparatus 100. The personal identification device 250 incorporates therein a recording medium on which data of authentication information for use in the authentication process for the user. For example, the authentication information recorded in the personal identification device 250 is an ID, a user name, a password, and a digital certificate and the like for identifying the user.

The server apparatus 100 uses the authentication information in the personal identification device 250 for mutual authentication with the terminal device 200 to reserve a secure communication channel. In addition, in sending data, the server apparatus 100 checks whether the personal identification device 250 is connected to the terminal device 200, and sends data when the personal identification device 250 is connected thereto. Generally, even though the personal identification device 250 is removed after mutual authentication is conducted between the server apparatus 100 and the terminal device 200 and a communication channel is established, encrypted communications are continued unless the terminal device 200 disconnects the communication channel. In this case, suppose software is authorized software, the communication channel is generally disconnected at the same time when the personal identification device is removed. However, for example, in the case in which malicious software such as virus software exists, it is likely that the connection is maintained as though communications are continuing.

In this system, the server apparatus 100 checks whether the personal identification device 250 is removed from the terminal device 200 before data is sent, that is, checks whether the terminal device 200 can reliably use the personal identification device 250. Thus, such an event can be prevented that data is sent to the terminal device 200 from which the personal identification device 250 is removed and information is leaked to a third party. As described above, the outline of the authentication system 10 is described.

Figure 2:
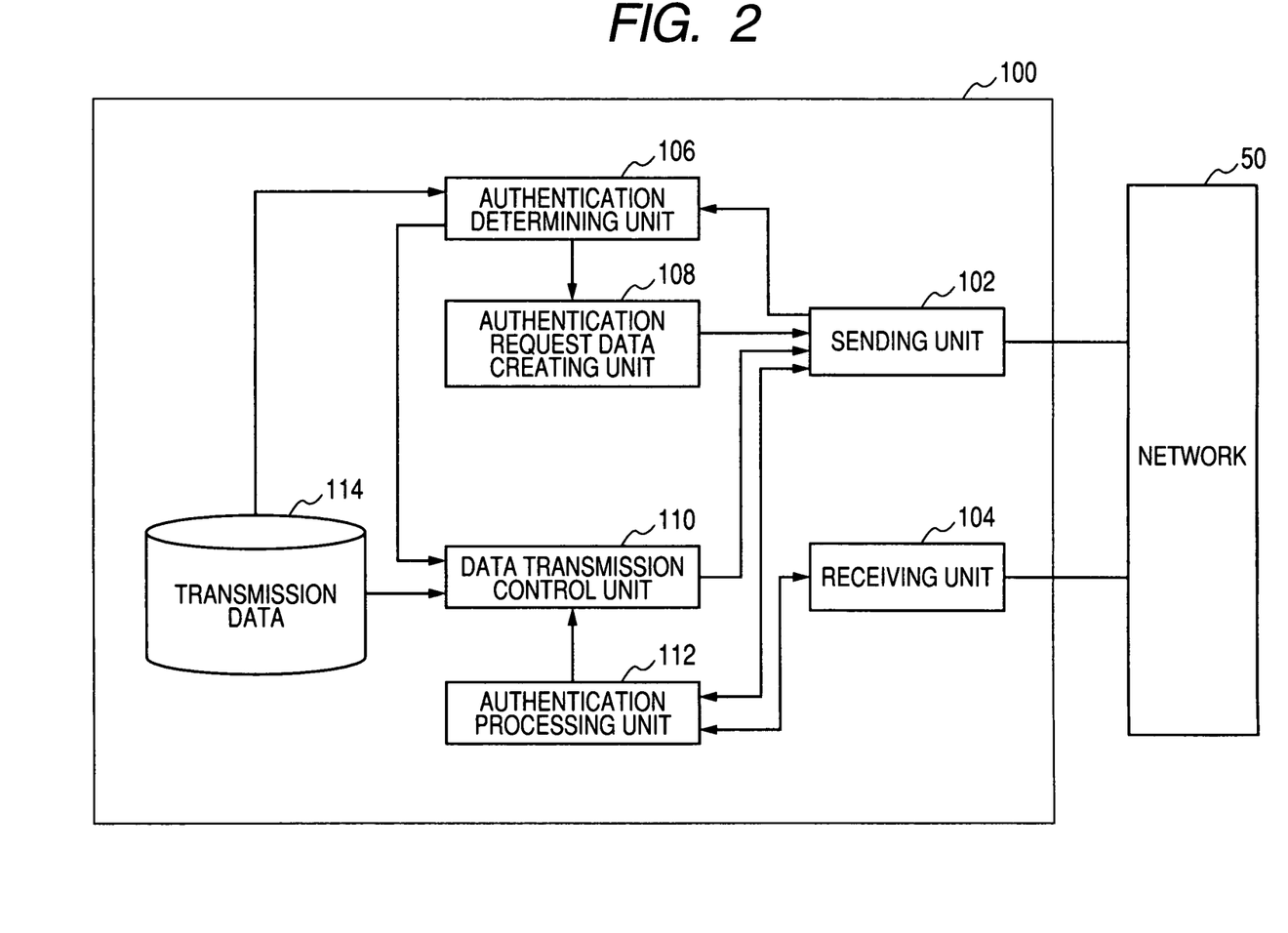
FIG. 2 shows a block diagram depicting the functional configuration of a server apparatus according to the embodiment.
Figure 3:
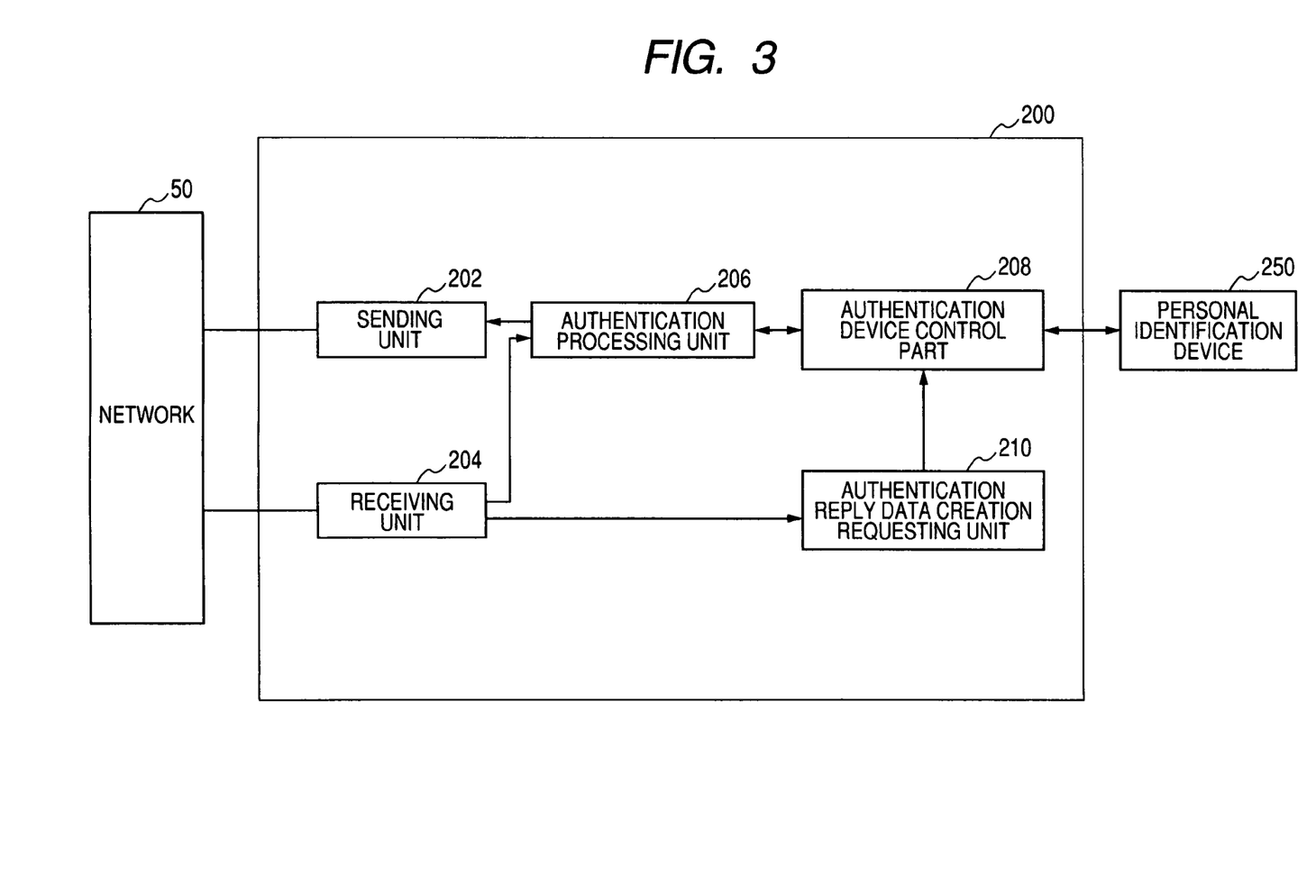
FIG. 3 shows a block diagram depicting the functional configuration of a terminal device according to the embodiment.

Next, exemplary configurations of the server apparatus 100 and the terminal device 200 will be described with reference to FIGS. 2 and 3. FIG. 2 shows a block diagram depicting the functional configuration of the server apparatus 100, and FIG. 3 shows a block diagram depicting the functional configuration of the terminal device 200.

First, the functional configuration of the server apparatus 100 will be described. The server apparatus 100 communicates with the terminal device 200 over the network 50, authenticates the user who is making access from the terminal device 200 to the server apparatus 100, or sends data to the authenticated terminal device 200.

As shown in FIG. 2, the server apparatus 100 is configured to include a sending unit 102, a receiving unit 104, an authentication determining unit 106, an authentication request data creating unit 108, a data transmission control unit 110, an authentication processing unit 112, and transmission data 114.

The sending unit 102 is a communication interface that is configured of a communication device and the like to connect to the network 50, and has a function of sending data to the terminal device 200 over the network 50. The sending unit 102 sends data such as authentication request data created by the authentication request data creating unit 108, described later, to the terminal device 200. In addition, the sending unit 102 uses a protocol such as SSL (Secure Socket Layer) or IPSec (Security Architecture for Internet Protocol) to conduct encrypted communications with the terminal device 200 in which the authentication process is successful.

The receiving unit 104 is a communication interface that is configured of a communication device and the like to connect to the network 50, and has a function of receiving data from the terminal device 200 over the network 50. The receiving unit 104 receives data sent from the terminal device 200, and supplies the date to the authentication processing unit 112 and the like. In addition, as similar to the sending unit 102, the receiving unit 104 uses a protocol such as SSL (Secure Socket Layer) or IPSec (Security Architecture for Internet Protocol) to conduct encrypted communications with the terminal device 200 in which the authentication process is successful.

The authentication determining unit 106 has a function of determining whether it is necessary to authenticate the terminal device 200 depending on the contents of data that is stored in the transmission data 114 and sent to the terminal device 200. As the result of determination by the authentication determining unit 106, when it is determined that it is necessary to authenticate the terminal device 200, the authentication determining unit 106 supplies the determined result to the authentication request data creating unit 108. In addition, when it is determined that it is unnecessary to authenticate the terminal device 200, the authentication determining unit 106 supplies the determined result to the data transmission control unit 110. For example, such a scheme may be possible that it is determined that it is necessary to authenticate the terminal device 200 for data such as user's personal information that is necessary to prevent leakage to a third party, whereas it is determined that it is unnecessary to authenticate the terminal device 200 for data such as advertisements that are unnecessary to prevent leakage to a third party.

As described above, in the embodiment, because it is likely that the personal identification device 250 is removed from the terminal device 200 after mutual authentication is established between the server apparatus 100 and the terminal device 200, it is configured that the server apparatus 100 checks whether the terminal device 200 is using the personal identification device 250 before data is sent. However, it is unnecessary to confirm the personal identification device 250 even in sending data such as advertisements that are unnecessary to prevent leakage to a third party. Therefore, depending on the contents of transmission data, the authentication determining unit 106 determines whether it is necessary to authenticate the terminal device 200, whereby unnecessary communications can be omitted while security is maintained.

The authentication request data creating unit 108 has a function of creating authentication request data that authenticates the terminal device 200. The authentication request data is time information at the time of sending data, temporarily random values, or hashes of data in communications, which includes information that can be created only when data is sent to the terminal device 200. In other words, the authentication request data is data that is changed every time when authentication request data is created and that is used only one time. The authentication request data creating unit 108 supplies the created authentication request data to the sending unit 102.

The data transmission control unit 110 has a function of controlling transmission of data to be sent to the terminal device 200. As described above, the transmission data 114 stores therein data that authentication is necessary before sent and data that authentication is unnecessary. Depending on the determination made by the authentication determining unit 106, the data transmission control unit 110 supplies data that authentication is necessary to the sending unit 102 after the authentication processing unit 112 confirms that the terminal device 200 is authenticated, whereas the data transmission control unit 110 supplies data that authentication is unnecessary to the sending unit 102 as it is.

In order to reserve a secure communication channel, the authentication processing unit 112 has a function of using authentication information of the personal identification device 250 connected to the terminal device 200 for mutual authentication with the terminal device 200. The authentication processing unit 112 requests the terminal device 200 for authentication when the authentication processing unit 112 receives a login request from the terminal device 200. In response to this request, when the terminal device 200 sends information such as an ID and a password, the authentication processing unit 112 conducts a mutual authentication process according to a defined method with these items of information. For example, the mutual authentication process conducted here may be conducted according to public key cryptography such as RSA (Rivest Shamir Adleman) algorithm, ElGamal encryption system, or elliptic-curve cryptography.

When the authentication process is successful, an encrypted communications protocol such as SSL or IPSec is used to conduct secure communications between the server apparatus 100 and the terminal device 200. After that, even though the personal identification device 250 is removed, encrypted communications are continued unless the terminal device 200 disconnects the communication channel. In the embodiment, in sending data after a secure communication channel is established as described above, the authentication processing unit 112 authenticates the terminal device 200. Next, the authentication of the terminal device after the authentication processing unit 112 establishes a secure communication channel will be described.

The authentication processing unit 112 has a function of authenticating the terminal device 200 based on authentication reply data corresponding to authentication request data created with the authentication device 250 on the terminal device 200. As described above, the authentication request data is time information at the time of sending data, temporarily random values, or hashes of data in communications. The authentication reply data sent from the terminal device 200 is data that a signature is added to the authentication request data with the authentication device 250. The authentication processing unit 112 verifies the signature of authentication reply data with a public key, for example.

As the result of the verification of the signature, when it is determined that the signature is correct, it is determined that the authentication device 250 is still attached to the terminal device 200 and the authentication device 250 is usable. In other words, data that authentication is necessary can be sent to the terminal device 200. On the other hand, as the result of the verification of the signature, when the signature is incorrect, or when authentication reply data is not sent, it is determined that the authentication device 250 is removed from the terminal device 200, and data that authentication is necessary is not sent. In addition, in this case, the communication channel may be disconnected.

As discussed above, the functional configuration of the server apparatus 100 has been described. In addition, the sending unit 102, the receiving unit 104, the authentication determining unit 106, the authentication request data creating unit 108, the data transmission control unit 110, and the authentication processing unit 112 of the server apparatus 100 can be implemented by installing in the server apparatus 100 a software program that runs the functions of the individual units, or can be implemented by dedicated hardware. In addition, the software program may be run by reading a software program stored on a computer readable recording medium, or may be provided to the server apparatus 100 over networks and the like.

Next, the functional configuration of the terminal device 200 will be described. As shown in FIG. 3, the terminal device 200 is configured to include a sending unit 202, a receiving unit 204, an authentication processing unit 206, an authentication device control part 208, and an authentication reply data creation requesting unit 210.

The sending unit 202 is a communication interface that is configured of a communication device to connect to the network 50, and the like, and has a function of sending data to the server apparatus 100 over the network 50. The sending unit 202 sends data such as authentication reply data created by the personal identification device 250 to the server apparatus 100. In addition, with the server apparatus 100 in which the authentication process is successful, the sending unit 202 uses a protocol such as SSL (Secure Socket Layer) or IPSec (Security Architecture for Internet Protocol) to conduct encrypted communications.

The receiving unit 204 is a communication interface that is configured of a communication device to connect to the network 50, and the like, and has a function of receiving data from the server apparatus 100 over the network 50. The receiving unit 204 receives data sent from the server apparatus 100, and supplies the date to the authentication processing unit 112 and other units. In addition, as similar to the sending unit 202, with the server apparatus 100 in which the authentication process is successful, the receiving unit 204 uses a protocol such as SSL (Secure Socket Layer) or IPSec (Security Architecture for Internet Protocol) to conduct encrypted communications.

The authentication processing unit 206 has a function of sending authentication information stored in the personal identification device 250 for mutual authentication with the server apparatus 100 in response to an authentication request from the server apparatus 100. When logging in to the server apparatus 100, the authentication processing unit 206 acquires authentication information recorded in the personal identification device 250 through the authentication device control part 208, and sends the authentication information to the server apparatus 100 to conduct a mutual authentication process. The mutual authentication process conducted here is performed by using a mutual authentication technique with an existing personal identification device, and thus the detailed descriptions are omitted.

The authentication device control part 208 has a function of reading and writing data to the personal identification device 250 connected to the terminal device 200, and detecting the status of connection to the personal identification device 250. For example, the personal identification device 250 is a device such as a USB token or an IC card, having a recording medium on which information such as a user ID and a password necessary for authentication incorporated therein. For example, in the case in which the personal identification device 250 is a USB token, the authentication device control part 250 conducts data read/write to the personal identification device 250 through a USB interface. In the case in which the personal identification device 250 is an IC card, the authentication device control part 250 conducts data read/write by an IC card reader/writer connected through a USB interface and the like.

In addition, the authentication device control part 208 has a function of detecting whether the personal identification device 250 is connected to the terminal device 200. For example, in the case in which the personal identification device 250 is a USB token, the authentication device control part 208 detects whether the personal identification device 250 is connected or not according to electric signals from the USB interface. When the authentication device control part 208 detects that the connection between the personal identification device 250 and the terminal device 200 is interrupted in the state in which a session is established between the terminal device 200 and the server apparatus 100, the authentication device control part 208 notifies the authentication processing unit 206 that the connection is interrupted.

Generally, when the connection between the personal identification device 250 and the terminal device 200 is interrupted, the communication channel to the server apparatus 200 is disconnected. However, in the case in which malicious software such as virus software exists, it is likely that communications are continued even though the interruption is detected. However, in the embodiment, as described above, because the conditions of connection to the personal identification device 250 can be confirmed before data is sent, it is possible not to send data when the personal identification device 250 is removed.

The authentication reply data creation requesting unit 210 has a function of requesting the authentication device 250 to create authentication reply data corresponding to the authentication request data sent from the server apparatus 100 through the authentication device control part 208. As described above, the authentication request data is data such as time information at the time of sending data, temporarily random values, or hashes of data in communications that can be created only when data is sent. The authentication device control part 208 requested for creation by the authentication reply data creation requesting unit 210 uses information stored in the personal identification device 250 to add a signature to the authentication request data for creating authentication reply data.

The authentication reply data is sent to the server apparatus 100. The server apparatus 100 verifies the sent signature of authentication reply data to determine whether the signature is correct. When it is determined that the signature is correct, the personal identification device 250 is connected to the terminal device 200. When it is determined that the signature is incorrect, the personal identification device 250 is removed. Thus, the server apparatus 200 does not send data, and communications are disconnected. As discussed above, the functional configuration of the terminal device 200 has been described.

In addition, the sending unit 202, the receiving unit 204, the authentication determining unit 206, the authentication device control part 208, and the authentication reply data creation requesting unit 210 of the terminal device 200 can be implemented by installing in the terminal device 200 a software program that runs the functions of the individual units, or can be implemented by dedicated hardware. In addition, the software program may be run by reading a software program stored on a computer readable recording medium, or provided to the terminal device 200 over networks and the like.

Figure 4:
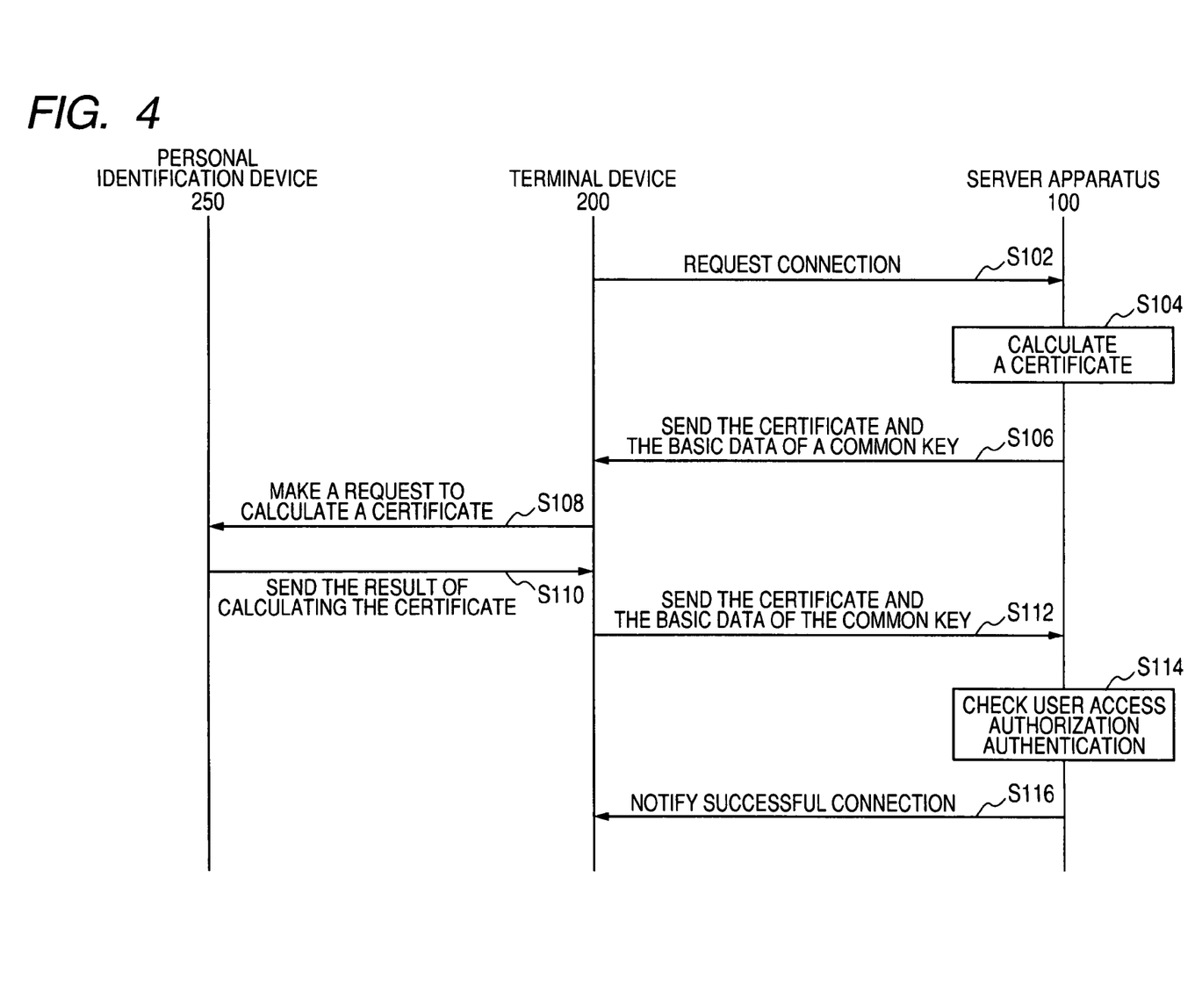
FIG. 4 shows a timing chart depicting a mutual authentication process according to the embodiment, which is conducted between the server apparatus and the terminal device.

Next, an authentication method of the authentication system 10 according to the embodiment will be described with reference to FIGS. 4 to 8. First, the mutual authentication process conducted between the server apparatus 100 and the terminal device 200 will be described with reference to FIG. 4. FIG. 4 shows a timing chart depicting the mutual authentication process conducted between the server apparatus 100 and the terminal device 200. As shown in FIG. 4, first, the terminal device 200 makes a connection request to the server apparatus 100 (S102). The server apparatus 100 is requested for connection in Step S102, and calculates a certificate (S104).

Then, the server apparatus 100 sends the certificate calculated in Step S104 and the basic data of a common key to the terminal device 200 (S106). Thus, the identity of the server apparatus 100 is known. In addition, as the basic data of a common key, a type or system of encryption, etc. is sent. The terminal device 200 requests the personal identification device 250 to calculate a certificate (S108), and the personal identification device 250 sends the result of calculating the certificate to the terminal device 200 (S110). The terminal device 200 sends the certificate and the basic data of the common key sent from the personal identification device 250 in Step S110 to the server apparatus 100 (S112).

The server apparatus 100 receives the certificate and the basic data of the common key sent in Step S112, and confirms user access authorization authentication of the terminal device 200 from the sent certificate and the basic data of the common key (S114). For example, when information about a user who has access authorization is stored in advance, the server apparatus 100 compares the stored user information with user information sent from the terminal device 200, and determines whether the user has access authorization. In Step S114, if it is determined that the user has access authorization, the server apparatus 100 notifies that connection is successful (S116). As described above, a session is established between the server apparatus 100 and the terminal device 200, and a secure communications path is formed according to encrypted communications.

Figure 5:
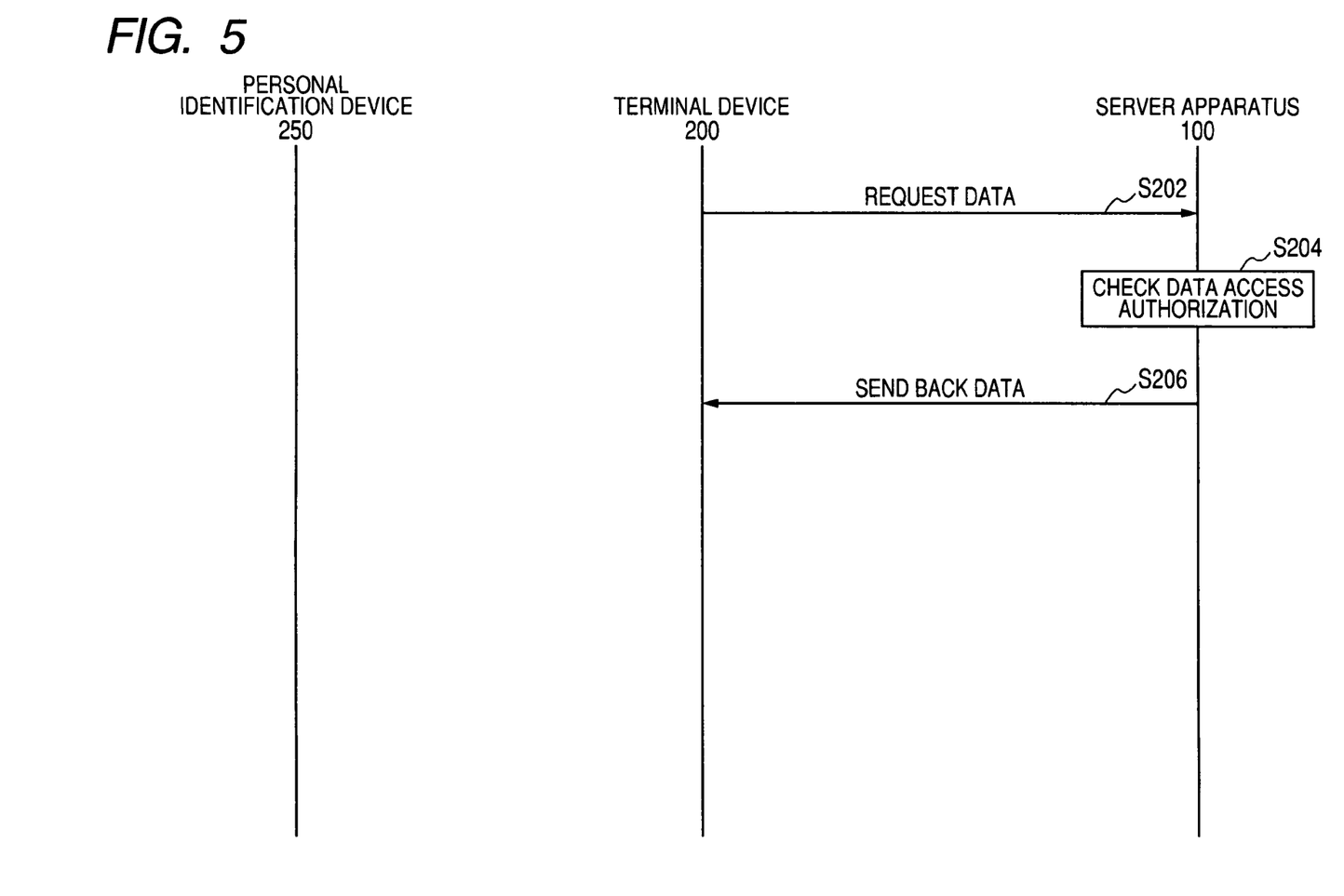
FIG. 5 shows a timing chart depicting a data transmission process according to the embodiment, which is conducted by the server apparatus after a session is established.

Next, a data transmission process conducted by the server apparatus 100 after the session is established will be described with reference to FIG. 5. FIG. 5 shows a timing chart depicting the data transmission process conducted by the server apparatus 100 after the session is established when sending data that is unnecessary to authenticate the terminal device 200. First, the terminal device 200 requests the server apparatus 100 to send data (S202).

The server apparatus 100 is requested to send data in Step S202, and checks whether the requested data is data that access authorization is necessary (S204). Confirmation whether to be data that access authorization is necessary is conducted in such a way that the authentication determining unit 106 of the server apparatus 100 determines whether the data is data necessary to authenticate the terminal device 200 that is the destination of the data. In Step S204, if it is determined that the data is data that access authorization is unnecessary, the server apparatus 100 does not authenticate the terminal device 200, and sends back the data to the terminal device 200 (S206).

Figure 6:
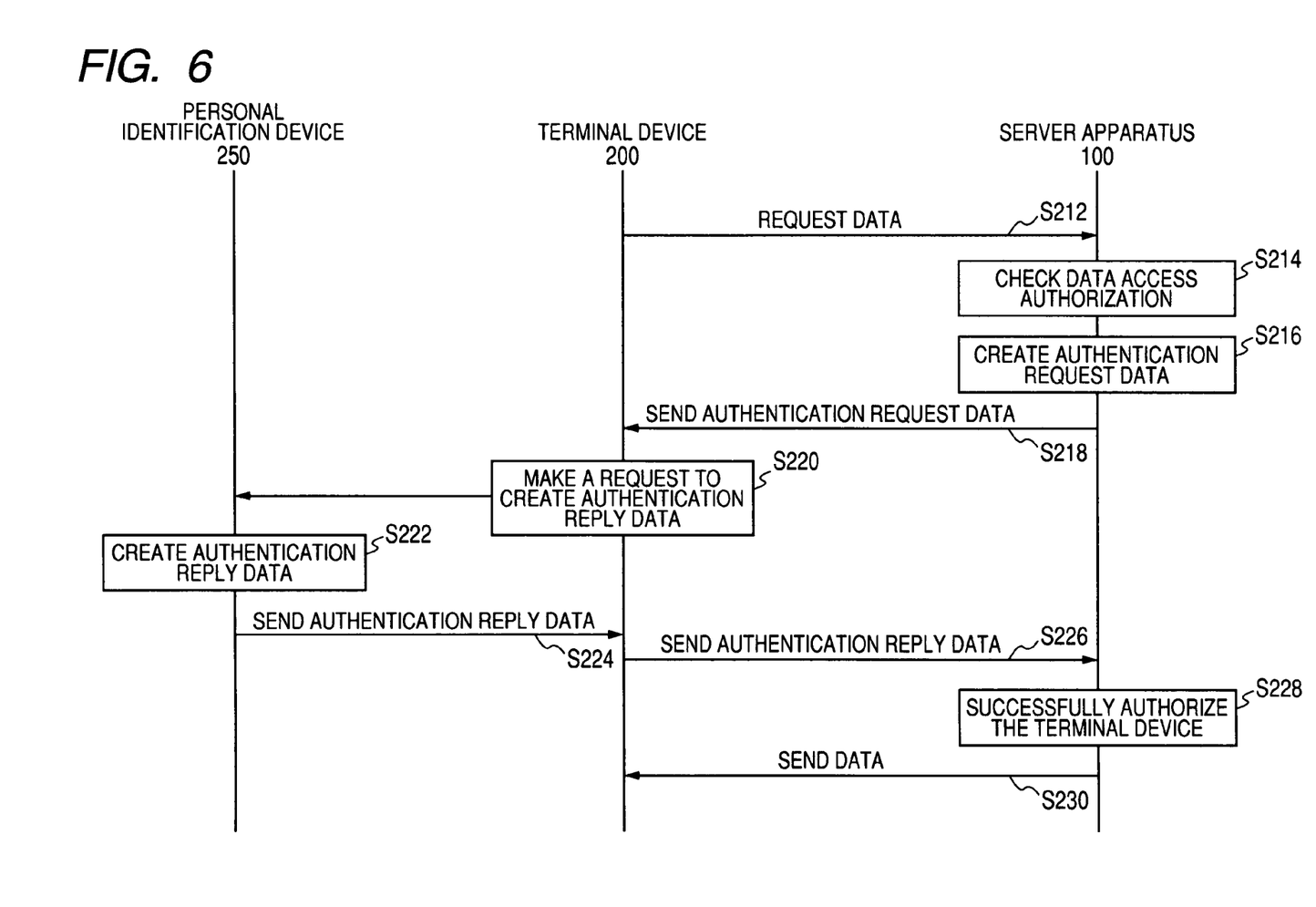
FIG. 6 shows a timing chart depicting an authentication process according to the embodiment, which is conducted by the server apparatus after a session is established.

FIG. 6 shows a timing chart depicting an authentication process conducted by the server apparatus 100 after the session is established when sending data that is necessary to authenticate the terminal device 200. First, the terminal device 200 requests the server apparatus 100 to send data (S212). The server apparatus 100 is requested to send data in Step S212, and checks whether the requested data is data that access authorization is necessary (S214). In Step S214, if it is determined that the data is data that access authorization is necessary, that is, if it is determined that the data is data necessary to authenticate the terminal device 200, the server apparatus 100 creates authentication request data (S216). Then, the server apparatus 100 sends the authentication request data created in Step S216 to the terminal device 200 (S218).

The terminal device 200 receives the authentication request data sent from the server apparatus 100 in Step S218, and requests the personal identification device 250 to create authentication reply data (S220). The personal identification device 250 is requested to create authentication reply data in Step S220, and creates authentication reply data based on user information such as a user ID and a password stored therein (S222). The personal identification device 250 creates authentication reply data in Step S222, and sends the authentication reply data to the terminal device 200 (S224). The terminal device 200 receives the authentication reply data sent from the personal identification device 250 in Step S224, and sends the authentication reply data to the server apparatus 100 (S226).

The server apparatus 100 receives and verifies the authentication reply data sent from the terminal device 200 in Step S226, and authenticates the terminal device 200. If the server apparatus 100 is able to authenticate the terminal device 200 (S228), the server apparatus 100 sends data to the terminal device 200 (S230). In the embodiment, the case will be described in which the terminal device 200 requests data. However, the invention is not limited to such an example. The server apparatus 100 may send data, without making a request for data by the terminal device 200. Also in this case, the server apparatus 100 authenticates the terminal device 200 just before sending data, whereby data can be securely sent.

Figure 7:
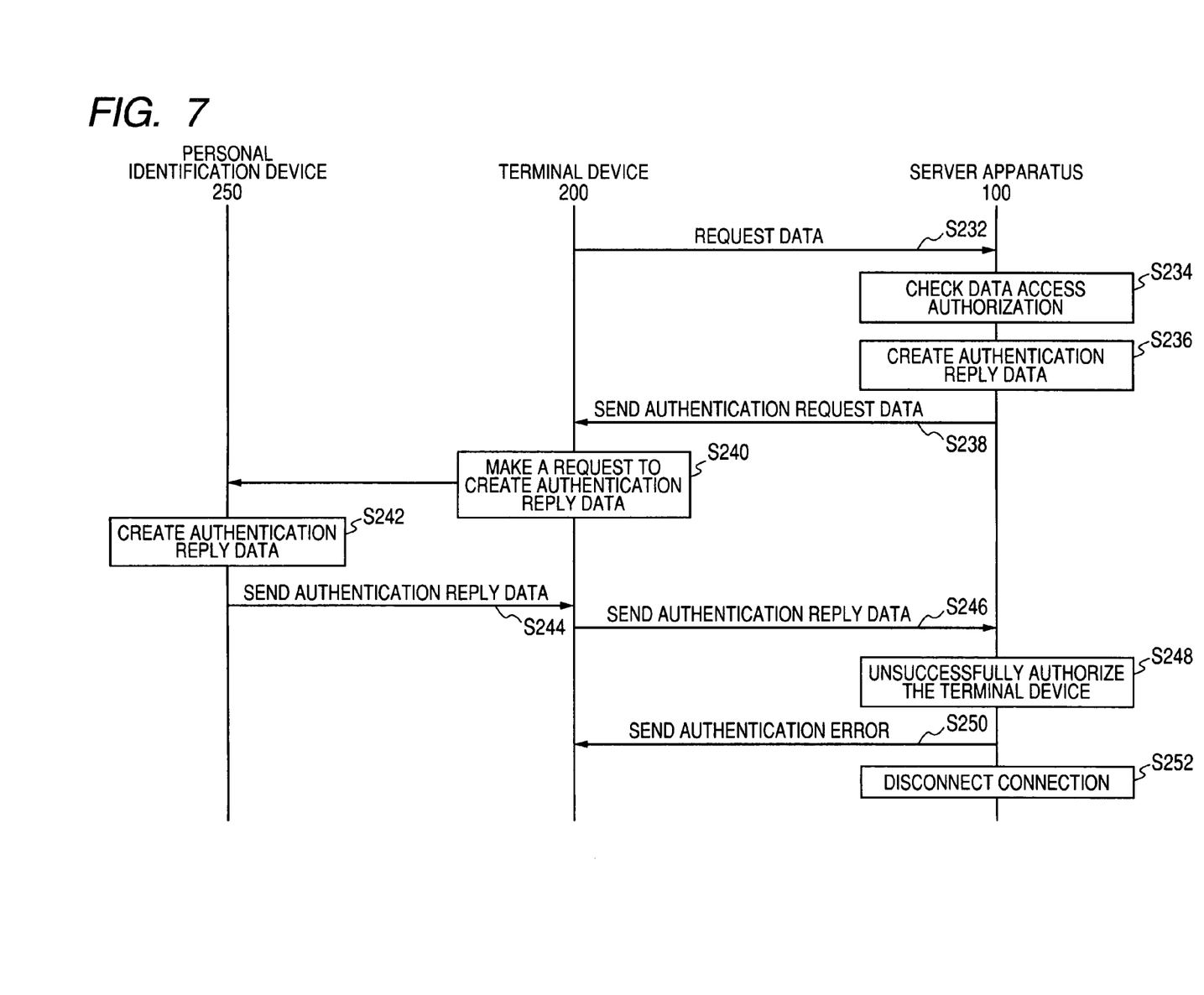
FIG. 7 shows a timing chart depicting the authentication process according to the embodiment, which is conducted by the server apparatus after a session is established.

Next, the case will be described in which authentication is unsuccessful in the authentication process shown in FIG. 6 with reference to FIG. 7. FIG. 7 shows a timing chart depicting an authentication process conducted by the server apparatus 100 after the session is established when sending data that is necessary to authenticate the terminal device 200. Because the flow from the process step in which the terminal device 200 requests data to the process step in which the terminal device 200 sends authentication reply data (Step S232 to Step S246) is similar to those in FIG. 6, the detailed descriptions are omitted.

The server apparatus 100 receives the authentication reply data sent in Step S246, and verifies the authentication reply data to authenticate the terminal device 200. If the server apparatus 100 is unable to authenticate the terminal device 200 (S248), the server apparatus 100 sends authentication error to the terminal device 200 (S250). After that, the server apparatus 100 disconnects the connection to the terminal device 200 (S252).

When the authentication of the terminal device 200 is unsuccessful in Step S248, the status of the personal identification device 250 is as follows: the personal identification device 250 is removed which has been connected to the terminal device 200 at the time of establishing the session, or it is difficult to correctly read user information out of the personal identification device 250. When the server apparatus 100 sends data in this case, it is likely that information is leaked to a third party. Thus, it is unable to send data to the terminal device 200. In addition, as described above, the connection between the server apparatus 100 and the terminal device 200 is conducted with the personal identification device 250. Therefore, because it is difficult to reserve a secure communication channel when it is unable to confirm the connection of the personal identification device 250, it is necessary that the server apparatus 100 disconnects the connection to the terminal device 200.

Figure 8:
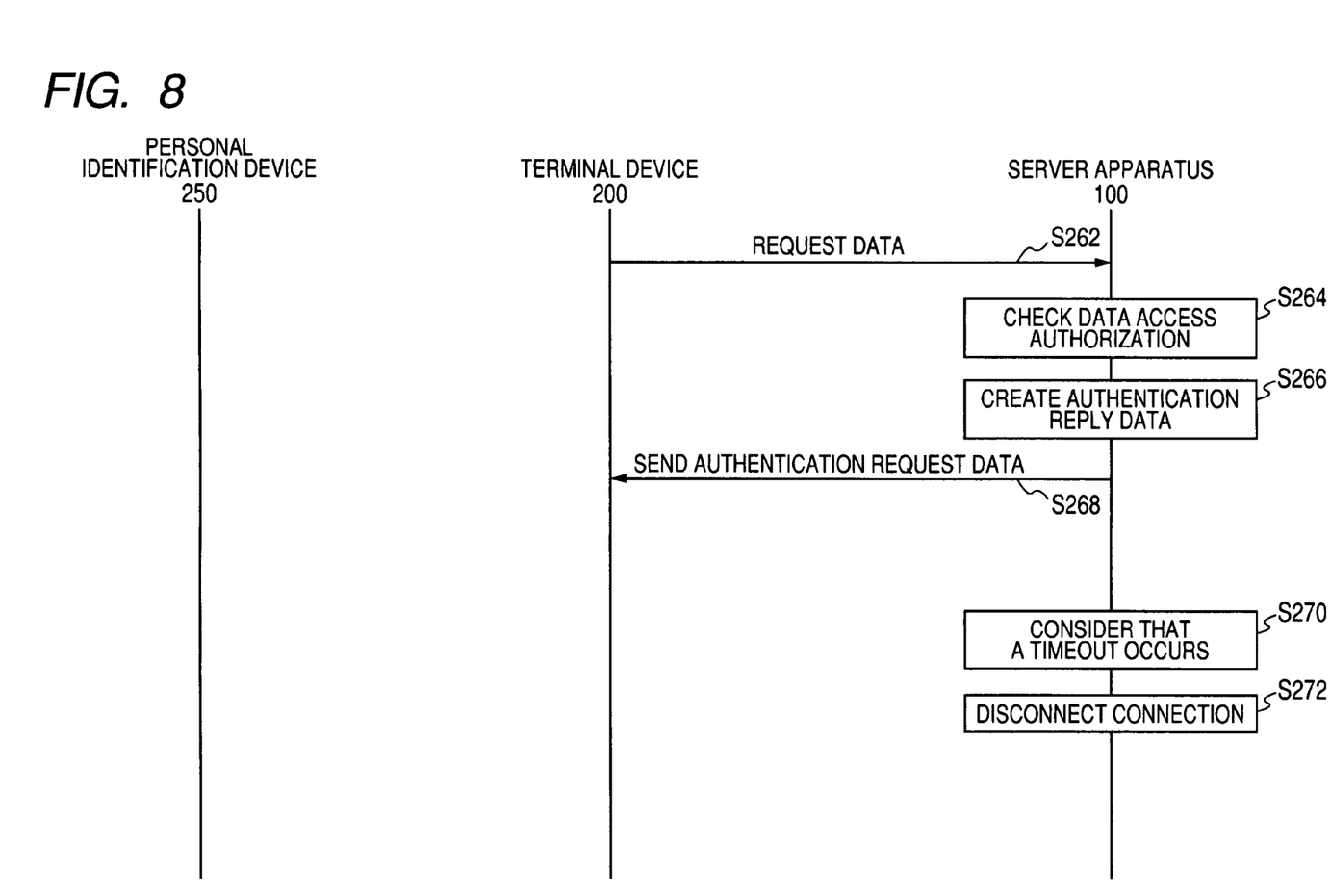
FIG. 8 shows a timing chart depicting the authentication process according to the embodiment, which is conducted by the server apparatus after a session is established.

Next, the case will be described in which a timeout occurs in the authentication process shown in FIG. 6 with reference to FIG. 8. FIG. 8 shows a timing chart depicting an authentication process conducted by the server apparatus 100 after the session is established when sending data that is necessary to authenticate the terminal device 200. As similar to the authentication process shown in FIG. 6, first, the terminal device 200 requests the server apparatus 100 to send data (S262). The server apparatus 100 is requested to send data in Step S262, and checks whether the requested data is data that access authorization is necessary (S264).

In Step S264, if it is determined that the data is data that access authorization is necessary, that is, if it is determined that the data is data necessary to authenticate the terminal device 200, the server apparatus 100 creates authentication request data (S266). Then, the server apparatus 100 sends the authentication request data created in Step S266 to the terminal device 200 (S268).

However, if the terminal device 200 does not send authentication reply data even though a certain time period has elapsed after the server apparatus 200 sends the authentication request data in Step S268, the server apparatus 100 considers that a timeout occurs in the authentication process (S270), and disconnects the connection to the terminal device 200 (S272). As discussed above, according to the embodiment, the authentication method of the authentication system 10 has been described.

According to the embodiment, after the personal identification device 250 connected to the terminal device 200 is used for mutual authentication between the server apparatus 100 and the terminal device 200 and a secure communication channel is reserved, authentication request data to authenticate the terminal device 200 is created and sent to the terminal device 200 before the server apparatus 100 sends data to the terminal device 200. The terminal device 200 receives the authentication request data sent from the server apparatus 100, uses the personal identification device 250 to create authentication reply data corresponding to the authentication request data, and sends back the authentication reply data to the server apparatus 100. The server apparatus 100 authenticates the terminal device 200 based on the authentication reply data sent from the terminal device 200.

The server apparatus 100 can send data only when the server apparatus 100 is able to authenticate the terminal device 200 before sending data after the session is established to the terminal device 200. In other words, the server apparatus 100 can check whether the personal identification device 250 is removed from the terminal device 200 before sending data. Therefore, data is sent only when it is determined that the terminal device 200 can reliably use the personal identification device 250. Accordingly, such an event can be prevented that data is sent to the terminal device 200 from which the personal identification device 250 is removed and information is leaked to a third party.

As discussed above, a preferred embodiment of the invention has been described in detail with reference to the accompanying drawings. However, an embodiment of the invention is not limited to this exemplary embodiment.

It should be understood by those skilled in the art that various modifications, combinations, sub-combinations and alterations may occur depending on design requirements and other factors insofar as they are within the scope of the appended claims or the equivalents thereof.

What is claimed is:

1. An authentication system, comprising:
    a server apparatus;
    a terminal device connected to the server apparatus over a network; and
    an authentication device connectable to the terminal device and used for authentication at the time of establishing a session between the terminal device and the server apparatus,
    the server apparatus including:
        an authentication request data creating unit configured to create authentication request data to authenticate the terminal device, and
        a sending unit configured to send the authentication request data created by the authentication request data creating unit;
    the terminal device including:
        a receiving unit configured to receive the authentication request data sent from the server apparatus,
        an authentication reply data creation requesting unit configured to request the authentication device to create authentication reply data corresponding to the authentication request data received by the receiving unit, and
        a sending unit configured to send the authentication reply data created by the authentication device to the server apparatus; and the server apparatus further including:
        an authentication processing unit configured to authenticate the terminal device based on the authentication reply data sent from the terminal device,
        wherein as a result of the authentication conducted by the authentication processing unit, a data is sent to the terminal device when the terminal device is authenticated, the result of the authentication conducted by the authentication processing unit providing confirmation as to whether the authentication device is connected to the terminal device or whether the authentication device has been removed from the terminal device in that the terminal device is authenticated when the authentication device is connected to the terminal device, and
        after a predetermined time period elapses from a time that the sending unit of the server apparatus sends the authentication request data to the terminal device without the sending unit of the terminal device sending the authentication reply data to the server apparatus, the server apparatus considers a timeout to have occurred and terminates the connection between the server apparatus and the terminal device.

2. A server apparatus wherein an authentication device connectable to a terminal device is used for authentication at the time of establishing a session to the terminal device connected over a network, the server apparatus comprising:
    an authentication request data creating unit configured to create authentication request data to authenticate the terminal device;
    a sending unit configured to send the authentication request data created by the authentication request data creating unit;
    a receiving unit configured to receive authentication reply data created by the authentication device connected to the terminal device and corresponding to the authentication request data; and
    an authentication processing unit configured to authenticate the terminal device based on the authentication reply data received by the receiving unit,
    wherein as a result of the authentication conducted by the authentication processing unit, a data is sent to the terminal device when the terminal device is authenticated, the result of the authentication conducted by the authentication processing unit providing confirmation as to whether the authentication device is connected to the terminal device or whether the authentication device has been removed from the terminal device in that the terminal device is authenticated when the authentication device is connected to the terminal device, and after a predetermined time period elapses from a time that the sending unit of the server apparatus sends the authentication request data to the terminal device without the terminal device sending the authentication reply data to the server apparatus, the server apparatus considers a timeout to have occurred and terminates the connection between the server apparatus and the terminal device.

3. The server apparatus according to claim 2, wherein the authentication request data creating unit creates the authentication request data just before the data is sent in response to a data sending request from the terminal device.

4. The server apparatus according to claim 2, wherein the authentication request data creating unit creates the authentication request data every time when the terminal device is authenticated.

5. The server apparatus according to claim 2, wherein as a result of authentication conducted by the authentication processing unit, connection to the terminal device is disconnected when it is unable to authenticate the terminal device.

6. The server apparatus according to claim 2, wherein as a result of authentication conducted by the authentication processing unit, authentication error is sent to the terminal device when it is unable to authenticate the terminal device.

7. The server apparatus according to claim 2, comprising:
an authentication determining unit configured to determine whether it is necessary to authenticate the terminal device depending on contents of the data sent to the terminal device,
wherein the authentication request data creating unit creates the authentication request data when the authentication determining unit determines that it is necessary to authenticate the terminal device.

8. The server apparatus according to claim 2, wherein the authentication request data includes time information at the time of sending the data and hashes of transmission data, and is created every time when the data is sent.

9. A terminal device connected to a server apparatus over a network, wherein an authentication device is used for authentication at the time of establishing a session to the server apparatus, the terminal device comprising:
a receiving unit configured to receive authentication request data created by the server apparatus to authenticate the terminal device;
an authentication reply data creation requesting unit configured to request the authentication device to create authentication reply data corresponding to the authentication request data received by the receiving unit; and
a sending unit configured to send the authentication reply data created by the authentication device to the server apparatus,
wherein as a result of the authentication conducted by the server apparatus, a data is sent to the terminal device from the server apparatus when the server apparatus authenticates the terminal device, the result of the authentication conducted by the server apparatus providing confirmation as to whether the authentication device is connected to the terminal device or whether the authentication device has been removed from the terminal device in that the terminal device is authenticated when the authentication device is connected to the terminal device, and
after a predetermined time period elapses from a time that the server apparatus sends the authentication request data to the terminal device without the sending unit of the terminal device sending the authentication reply data to the server apparatus, the server apparatus considers a timeout to have occurred and terminates the connection between the server apparatus and the terminal device.

10. An authentication method implemented with a server apparatus that uses an authentication device connectable to a terminal device for authentication at the time of establishing a session to the terminal device connected over a network, the method comprising the steps of:
creating authentication request data to authenticate the terminal device;
sending the created authentication request data;
receiving authentication reply data created by the authentication device connected to the terminal device and corresponding to the authentication request data;
authenticating the terminal device based on the received authentication reply data; and
as a result of the authentication of the terminal device, sending a data to the terminal device when the terminal device is authenticated, the result of the authentication of the terminal device providing confirmation as to whether the authentication device is connected to the terminal device or whether the authentication device has been removed from the terminal device in that the terminal device is authenticated when the authentication device is connected to the terminal device, and
after a predetermined time period elapses from a time that the server apparatus sends the authentication request data to the terminal device without the terminal device sending the authentication reply data to the server apparatus, the server apparatus considers a timeout to have occurred and terminates the connection between the server apparatus and the terminal device.

* * * * *